(12) United States Patent
Lausch et al.

(10) Patent No.: US 10,074,461 B2
(45) Date of Patent: Sep. 11, 2018

(54) ELECTRICAL FLAT CONDUCTOR FOR MOTOR VEHICLES

(71) Applicant: Auto-Kabel Management GmbH, Hausen i.W. (DE)

(72) Inventors: Peter Lausch, Krefeld (DE); Sebastian Martens, Straelen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 15/329,721

(22) PCT Filed: Apr. 29, 2015

(86) PCT No.: PCT/EP2015/059267
§ 371 (c)(1),
(2) Date: Jan. 27, 2017

(87) PCT Pub. No.: WO2016/015883
PCT Pub. Date: Feb. 4, 2016

(65) Prior Publication Data
US 2017/0213620 A1    Jul. 27, 2017

(30) Foreign Application Priority Data
Jul. 31, 2014  (DE) .................. 10 2014 011 180

(51) Int. Cl.
H01B 7/08 (2006.01)
B60R 16/02 (2006.01)
H01B 7/02 (2006.01)

(52) U.S. Cl.
CPC ........... H01B 7/08 (2013.01); B60R 16/0207 (2013.01); B60R 16/02 (2013.01); B60R 16/0215 (2013.01); H01B 7/02 (2013.01)

(58) Field of Classification Search
CPC .................................................. H01B 7/08
(Continued)

(56) References Cited

U.S. PATENT DOCUMENTS 6,492,892 B1 * 12/2002 Brennan .............. H01F 27/2871
336/205
8,677,926 B2 * 3/2014 Goto .................... H01B 13/065
118/125
(Continued)

FOREIGN PATENT DOCUMENTS

CN      101448681 A      6/2009
CN      102122550 A      7/2011
(Continued)

OTHER PUBLICATIONS

International Searching Authority, International Search Report—International Application No. PCT/EP2015/059267, dated Nov. 23, 2015, together with the Written Opinion of the International Searching Authority, 21 pages (in German).
(Continued)

*Primary Examiner* — Chau N Nguyen
(74) *Attorney, Agent, or Firm* — Sunstein Kann Murphy & Timbers LLP (57) ABSTRACT

The invention relates to an electrical flat conductor (40, 60, 80, 100) for motor vehicles with a flat conductor core (42, 62, 82, 102) of electrically conductive flat conductor material and with an insulation of an insulating material encasing the flat conductor core (42, 62, 82, 102), wherein the height (Hk) of the flat conductor core (42, 62, 82, 102) is less than the width (Bk) of the flat conductor core, wherein the flat conductor core (42, 62, 82, 102) has at least one narrow side (46a-b, 68a-b, 86a-b, 106a-b), which limits the width of the flat conductor core (42, 62, 82, 102) on one side, wherein the at least one narrow side (46a-b, 68a-b, 86a-b, 106a-b) of the flat conductor core (42, 62, 82, 102) has at least in sections over the length of the flat conductor (40, 60, 80, 100) a partial surface (52a-b, 70a-b, 114a-b), whose contour in the cross-section of the flat conductor core (42, 62, 82, 102)
(Continued)

forms a straight section (46a-b, 54a-b, 72a-b, 116a-b), which extends over a part of the height of the flat conductor core (42, 62, 82, 102), wherein the straight section (46a-b, 54a-b, 72a-b, 116a-b) extends over at least 75% of the height of the flat conductor core (42, 62, 82, 102). The invention furthermore relates to an electrical flat conductor (40, 60, 80, 100) for motor vehicles with a flat conductor core (42, 62, 82, 102) of electrically conductive flat conductor material and with an insulation (44, 64, 84, 104) of an insulating material encasing the flat conductor core (42, 62, 82, 102), wherein the height (Hk) of the flat conductor core (42, 62, 82, 102) is less than the width (Bk) of the flat conductor core (42, 62, 82, 102) and wherein the insulation (44, 64, 84, 104) at least in sections over the length of the flat conductor (40, 60, 80, 100) on at least one side (46a-b, 48a-b, 68a-b, 86a-b, 88a-b, 106a-b, 108a-b) of the flat conductor core (42, 62, 82, 102) has a greater wall thickness than on at least one other side (46a-b, 48a-b, 68a-b, 86a-b, 88a-b, 106a-b, 108a-b) of the flat conductor core (42, 62, 82, 102).

19 Claims, 4 Drawing Sheets

(58) Field of Classification Search
USPC .................................................. 174/117 FF
See application file for complete search history.

(56) References Cited

U.S. PATENT DOCUMENTS

| | | | |
|---|---|---|---|
| 9,177,695 B2 | 11/2015 | Lietz et al. | ............ H01B 7/08 |
| 9,330,817 B2 | 5/2016 | Goto | |
| 9,536,636 B2* | 1/2017 | Ikeda | ............ H01B 13/065 |
| 2006/0137899 A1* | 6/2006 | Schafer | ............ H01B 3/30 |
| | | | 174/128.1 |
| 2007/0090494 A1 | 4/2007 | Kimura et al. | ............... 257/632 |
| 2011/0171368 A1 | 7/2011 | Goto | ............... 427/117 |
| 2014/0027153 A1 | 1/2014 | Harwath | ............... 174/117 |
| 2014/0360756 A1* | 12/2014 | Honda | ............ H01B 3/308 |
| | | | 174/119 C |

FOREIGN PATENT DOCUMENTS

| | | | | |
|---|---|---|---|---|
| DE | 10 2006 050 705 A1 | 4/2008 | ............ H01B 7/08 |
| DE | 11 2007 000 364 T5 | 11/2008 | ............ H01B 7/00 |
| DE | 10 2008 003 332 A1 | 7/2009 | ............ H02G 3/30 |
| WO | WO 2007/097189 A1 | 8/2007 | ............ H01B 7/00 |

OTHER PUBLICATIONS

International Preliminary Examining Authority, International Preliminary Report on Patentability—International Application No. PCT/EP2015/058267, dated Sep. 29, 2016, 19 pages. (in German).
State Intellectual Property Office of P.R.C., Notification of First Office Action—Application No. 201580040641.2, 5 pages dated Aug. 14, 2017.
State Intellectual Property Office of P.R.C., Notification of First Office Action—Application No. 201580040641.2, 11 pages dated Aug. 14, 2017 (English translation).

* cited by examiner

ELECTRICAL FLAT CONDUCTOR FOR MOTOR VEHICLES

TECHNICAL FIELD

The invention relates to an electrical flat conductor for motor vehicles with a flat conductor core of conductive flat conductive material and with an insulation of an insulating material encasing the flat conductor core, wherein the height of the flat conductor core is less than the width of the flat conductor core.

BACKGROUND ART

Such electrical flat conductors are used for example in the automotive industry as an alternative to round conductors. Owing to the flat geometry of the flat conductors these can be used for example in cases in which there is little space available for their installation, such as for example behind a cladding in the interior of a motor vehicle.

Such a flat conductor includes a conductive flat conductor core, which extends in the longitudinal direction of the flat conductor and whose height (in cross-section) is less than its width. The flat conductor core is encased in an insulation in order to avoid undesirable electrical contacts of the flat conductor core with other conductive components in the environment of the flat conductor.

Such flat conductors are before their installation often bent by means of bending tools into a shape that is adapted to the desired contour of the flat conductor in the motor vehicle. In order to shape such a flat conductor a bending tool can for example be applied externally to one side of the flat conductor and a force can be exerted on this side of the flat conductor in order to effect a mechanical bending of the flat conductor, in particular of the flat conductor core.

With such shaping procedures there is the problem that the insulation of the flat conductor may be damaged as a result of the forces acting on the flat conductor, especially if comparatively soft insulating materials such as for example polyvinyl chloride (PVC) are used. The risk of damage to the insulation is particularly great if the shaping is performed on a narrow side of the flat conductor.

In order to avoid damage to the insulation of the flat conductor the bending processes could be changed by reducing the rates at which the bending tools act on the flat conductors, so that the forces acting on the insulation are also reduced. This leads however to longer cycle times in the bending processes, so that the production costs of 3D-bent flat conductors would be increased. Depending on the machine utilisation this procedure could even require the procurement of further bending devices, thereby also in addition incurring investment costs.

SUMMARY OF THE INVENTION

Against this background the object of the present invention is to provide an electrical flat conductor that has an improved resistance in particular to shaping of the flat conductor by means of bending tools.

This object is achieved with an electrical flat conductor for motor vehicles with a flat conductor core of electrically conductive flat conductor material and with an insulation of an insulating material encasing the flat conductor core, wherein the height of the flat conductor core is less than the width of the flat conductor core, wherein the flat conductor core has at least one narrow side that limits the width of the flat conductor core on one side and wherein the at least one narrow side of the flat conductor core has at least in sections over the length of the flat conductor a partial surface whose contour in the cross-section of the flat conductor core forms a straight section that extends over a part of the height of the flat conductor core, in that according to a first teaching of the present invention the said straight section extends over at least 75% of the height of the flat conductor core.

It was recognised that in this way an electrical flat conductor can be provided that has an improved resistance in particular to shaping of the flat conductor by means of bending tools.

The flat conductor core consists of conductive flat conductor material. The flat conductor material can preferably be aluminium or an aluminium alloy, since these have a low specific weight combined with a relatively high conductivity and are therefore advantageous as regards lightweight vehicle construction. Alternatively, however, other metals or metal alloys, such as for example copper alloys, can also be used as flat conductor material.

As insulating material a plastic may preferably be used, in particular a soft plastic with a microhardness of at most 90, in particular in the range from 50 to 90 (determined according to DIN EN 48). Examples of such insulating materials are polyvinyl chloride (PVC), polyurethane (PUR) or silicone. Soft plastics are particularly susceptible to damage during bending processes, so that the advantages of the invention are exhibited specifically in the case of flat conductors that have an insulation of soft plastic.

The electrical flat conductor can in particular be a power line, i.e. a line whose basic Task—in contrast to the case of data lines—consists in providing electrical energy. The electrical flat conductor can for example be formed as a vehicle battery lead. Preferably the electrical flat conductor is designed for a current intensity of at least 100 A, preferably at least 200 A, in particular at least 400 A. The flat conductor core preferably has a cross-section of at least 10 $mm^2$, more preferably of at least 16 $mm^2$. In particular the flat conductor core can have a cross-section in the range from 10 $mm^2$ to 240 $mm^2$, preferably 16 $mm^2$ to 160 $mm^2$. The insulating material of the flat conductor preferably has a specific insulation resistance of at least $10^9$ Ω·mm. The breakdown voltage of the insulation is preferably more than 5 kV. The wall thickness of the insulation is preferably in a range between 0.5 mm and 1.5 mm.

The height of the flat conductor core is less than the width of the flat conductor core. The height of the flat conductor core is understood to mean the largest extension of the flat conductor core over the height referred to a cross-section of the flat conductor core. The width of the flat conductor core is correspondingly understood to mean the largest extension of the flat conductor core in width referred to a cross-section of the flat conductor core. A cross-section of the flat conductor core is understood to mean the section of the flat conductor core with a cross-sectional plane that extends perpendicular to the local longitudinal extension direction of the flat conductor.

The flat conductor core has at least one narrow side, which limits the width of the flat conductor core (in cross-section) on one side. The narrow side is thus understood to mean an outer side of the flat conductor core by means of which the cross-section of the flat conductor core is limited laterally in the direction of its width. The sides of the flat conductor core that limit the flat conductor core in relation to its height are termed here broad sides. Since the height of a flat conductor core is less than its width, accordingly also the narrow sides are narrower than the broad sides of the flat conductor core.

The at least one narrow side of the flat conductor core has at least in sections over the length of the flat conductor core a partial surface. The partial surface extends therefore at least over one section in the longitudinal direction of the flat conductor. In the longitudinal direction of the flat conductor the partial surface can be formed straight or curved. The contour of this partial surface forms a straight section in the cross-section of the flat conductor core. The contour of the partial surface in the cross-section is understood to mean the intersection line of the partial surface with a cross-sectional plane of the flat conductor core. The partial surface therefore has no curvatures in the plane perpendicular to the local longitudinal extension direction of the flat conductor.

The straight section extends over a part of the height of the flat conductor core. In this regard the straight section in particular does not extend over the whole height of the flat conductor core. Preferably the straight section extends over at most 95%, preferably at most 90%, of the height of the flat conductor core. If the straight section extends over more than 90% or even more than 95% of the flat conductor core, this leads to sharp edges at the borders of the partial surface, so that these could act as it were as cutting edges on the insulation during the bending process and could therefore damage the insulation.

Preferably the straight section extends over a part of the height of the flat conductor core, which part is at least 0.6 mm, preferably at least 1.0 mm less than the height of the flat conductor core. In particular in each case at least 0.3 mm, preferably at least 0.5 mm of the full height of the flat conductor core remains on both sides of the straight section. With a substantially rectangular cross-section of the flat conductor core with rounded corners the corners can in addition have for example a radius of curvature of at least 0.3 mm, preferably at least 0.5 mm. In this way the flat conductor core is prevented from having too sharp edges at the borders of the partial surface.

The straight section extends furthermore over at least 75% of the height of the flat conductor core. Therewith, the partial surface of the narrow side extends in a direction transverse to the longitudinal extension direction of the flat conductor rectilinearly over at least 75% of the height of the flat conductor core. Owing to the presence of such a partial surface an improved resistance of the electrical flat conductor, in particular in a bending procedure of the flat conductor, can be achieved.

In the context of the present invention it was in fact recognised that when bending insulated flat conductors, insulation can be damaged on account of the in some cases high bending forces and thus high surface pressure exerted by the bending tool on the insulation of the flat conductors. Particularly when using comparatively thin flat conductors with a height of equal to or less than 2.5 mm, the pressure on a narrow side of the flat conductor can become so great during bending that the insulation is damaged or even stripped through the corresponding narrow side of the flat conductor core. In this case the flat conductor core in the region of the narrow side acts like a cutting blade and leads to a high compressive stress on the insulation, which ultimately leads to its breakdown.

Since a partial surface is provided whose contour in the cross-section of the flat conductor core forms a straight section that extends over at least 75% of the height of the flat conductor core, this means that when bending the flat conductor around the relevant narrow side a larger bearing surface of the flat conductor core is made available for the bending tool. In this way the force of the bending tool is distributed over a larger area of the narrow side, thereby resulting in lower bending pressures, i.e. lower local area pressures in the region of the narrow side. In this way a material-preserving bending process is made possible, since the smaller forces acting on the insulation no longer lead to a destruction of the insulation.

It was in particular recognised that the straight section should for this purpose extend over at least 75% of the height of the flat conductor core. With shorter straight sections the remaining bearing surface in the region of the narrow side would be so small in relation to the whole narrow side that the narrow side of the flat conductor core would act as it were a cutting blade on the insulation and would damage the latter.

Preferred embodiments of the previously mentioned flat conductor are described hereinafter. The individual embodiments can in principle be combined arbitrarily with one another.

According to one embodiment the flat conductor core has at least one broad side, which limits the height of the flat conductor core on one side, and the partial surface of the at least one narrow side of the flat conductor core extends substantially perpendicular to the at least one broad side of the flat conductor core. In this way, by horizontal alignment of the broad side for example on a support a substantially vertical alignment of the narrow side and thus a simple alignment of the narrow side with respect to a bending tool can be achieved. The term "substantially perpendicular" is understood here to mean that the corresponding surfaces extend in an angular range of 80°-100°, preferably 85°-95°, to one another.

According to a further embodiment the partial surface of the at least one narrow side extends substantially over the whole length of the flat conductor. In this way the flat conductor can be bent practically at any arbitrary point around the narrow side, without the insulation being subjected to excessive stress.

According to a further embodiment the flat conductor core has two narrow sides and two broad sides and a substantially rectangular cross-section. The two narrow sides of the substantially rectangular cross-section, which limit the width of the flat conductor core, are therefore termed narrow sides, and the broad sides, which limit the height of the flat conductor core are termed broad sides. Such flat conductors can be used in many applications in practice. In particular such a flat conductor core geometry facilitates the bending of the flat conductor in two directions perpendicular to one another, namely on the one hand in a direction of a narrow side and on the other hand in the direction of a broad side, so that complicated, in particular three-dimensional shaped flat conductors can be produced.

According to a further embodiment the flat conductor core has a substantially rectangular cross-section with rounded edges. Owing to such a cross-section the narrow sides have instead of a sharp edge, a smooth transition to the adjoining broad sides. In this way damage to the insulation due to sharp edges on the narrow sides can be avoided. Preferably the radii of curvature of the rounded corners on at least one narrow side of the flat conductor core are in each case at most one eighth of the height of the flat conductor core. In this way the rounded edges on a narrow side occupy at most one quarter of the height of the flat conductor core. The straight section running between the radii of curvature extends in the cross-section of the flat conductor core therefore over at least 75% of the height of the flat conductor core and thereby forms the previously described, sufficiently large partial surface of the narrow side.

With a height of the flat conductor core in the range from 1.5 mm to 2.5 mm, preferably up to 2 mm, the radii of curvature are preferably in the range from 0.2 mm to 0.3 mm, or up to 0.25 mm. According to a further embodiment the radii of curvature are preferably at least 0.3 mm, in particular 0.5 mm.

According to a second teaching of the present invention the previously described object is achieved with an electrical flat conductor core for motor vehicles with a flat conductor core of electrically conductive flat conductive material and with an insulation of an insulating material encasing the flat conductor core, wherein the height of the flat conductor core is less than the width of the flat conductor core, in that according to the invention the insulation at least in sections over the length of the flat conductor has on at least one side of the flat conductor core a larger wall thickness than on at least one other side of the flat conductor core.

It was recognised that, owing to the increase in the insulating wall thickness on one side of the flat conductor core, the insulation on this side can withstand larger mechanical loads, such as occur in particular in a bending of the flat conductor around this side. Compared to an increase of the overall insulating wall thickness of the flat conductor, this local increase in wall thickness has in addition the advantage of saving insulating material and installation space.

The greater wall thickness of the insulation on at least one side of the flat conductor core extends at least in sections over the length of the flat conductor, i.e. in the direction of the longitudinal extension of the flat conductor. Preferably the greater wall thickness extends at least over a section over the length of the flat conductor, in which the flat conductor is bent around the side or is intended for such a bending operation.

Preferred embodiments of the previously mentioned flat conductor are described hereinafter. The individual embodiments can in principle also be combined arbitrarily with one another.

According to one embodiment the flat conductor core has at least one narrow side, which limits the width of the flat conductor core on one side, and the flat conductor core has at least one broad side, which limits the height of the flat conductor core on one side, and the insulation has on the at least one narrow side of the flat conductor core a greater wall thickness than on the at least one broad side of the flat conductor core. In particular when bending around a narrow side of the flat conductor core large surface forces act on the insulation, so that an increase in the wall thickness of the insulation particularly on a narrow side is advantageous for an improved resistance to such mechanical bending operations.

According to a further embodiment the wall thickness of the insulation on the at least one side of the flat conductor core is at least 10%, preferably at least 15%, more preferably at least 20% and in particular at least 25% greater than on the at least one other side of the flat conductor core. It was found that, due to such an increase in the wall thickness of the insulation, a significant strengthening of the insulation in the region of the at least one side can be achieved, so that this can withstand greater loads.

According to a further embodiment the wall thickness of the insulation on the at least one side of the flat conductor core is at most 100%, preferably at most 75%, in particular at most 50% greater than on the at least one other side. In this way the flat conductor has a compact installation space.

According to a further embodiment the insulation has substantially over the whole length of the flat conductor on the at least one side of the flat conductor core a greater wall thickness than on the at least one other side of the flat conductor core. In this way the flat conductor can be bent practically at any arbitrary point around the at least one side, in particular around a narrow side, without the insulation being subjected to excessive loads.

According to a further embodiment the flat conductor core has two narrow sides and two broad sides and a substantially rectangular cross-section. The two narrow sides of the substantially rectangular cross-section, which limit the width of the flat conductor core, are therefore termed narrow sides, and the broad sides that limit the height of the flat conductor core are termed broad sides. Such flat conductors can be used in many applications in practice. In particular such a flat conductor core geometry facilitates the bending of the flat conductor in two mutually perpendicular directions, namely on the one hand in the direction of a narrow side and on the other hand in the direction of a broad side, so that flat conductors of complex shape can be produced. Preferably the insulation on at least one, preferably on both narrow sides, has a greater wall thickness than on the two broad sides of the flat conductor core.

According to a further embodiment of the flat conductor according to the first and/or the second teaching the height of the flat conductor core is at most 3.5 mm, preferably at most 2.5 mm. Flat conductors with such thin flat conductor cores are becoming increasingly important as power supply lines, since not only can the battery lead be formed as a flat conductor, but flat conductors can also be used for further high current conductors, such as for example the so-called EPS conductors (for supplying electronic power steering) or conductors for motor control (common rail, variable valve drive), roll stabilisation or the like. At the same time the problem of damage to the insulation when bending at the narrow edges occurs particularly frequently with these small thicknesses, so that the first and/or the second teaching of the present invention is particularly advantageous for such flat conductors. The height of the flat conductor core is furthermore preferably at least 1.5 mm. Thinner flat conductor cores are too limp and can no longer be handled satisfactorily.

The width of the flat conductor core is preferably at least 5 mm, in particular at least 6.5 mm. In this way a sufficient cross-section of the flat conductor core can be made available so that the flat conductor can be used as a power line. For the conduction of larger currents, such as for example when used as a battery lead, the width of the flat conductor core can also be at least 8 mm, 11 mm or even at least 14 mm, 20 mm or 30 mm.

In a further embodiment of the flat conductor according to the first and/or the second teaching the ratio of the height of the flat conductor core to the width of the flat conductor core is between 1:2 and 1:15, in particular between 1:5 and 1:10. With these ratios, with a low height of the flat conductor core flat conductor cross-sections are achieved that are sufficient for the currents to be conducted in the motor vehicle. A smaller ratio of the height to the width than 1:2 would require too much installation space in terms of height, and a ratio larger than 1:15 would require too much insulation material on account of the unfavourable cross-section or surface ratio, respectively, and could be laid only with relatively large bending radii in the flat plane.

According to a further embodiment of the flat conductor according to the first and/or the second teaching the flat conductor has at least one bend around a side, in particular around a narrow side of the flat conductor core. A bend around a narrow side of the flat conductor core is understood to mean that the narrow side is curved along the longitudinal extension of the flat conductor, i.e. has at least one change in direction. The bending is preferably performed around a bending axis that extends substantially parallel to the direction of the height of the flat conductor. With bends around a narrow side the problem of damage to the insulation occurs particularly frequently on account of the shorter dimensions of the narrow sides, so that the first and/or the second teaching of the present invention are particularly advantageous for flat conductors that are to be bent or are bent in this direction, respectively.

According to a further embodiment of the flat conductor according to the first and/or the second teaching the features of an embodiment of the first teaching and an embodiment of the second teaching are combined. Accordingly the aforementioned object is achieved with an electrical flat conductor for motor vehicles with a flat conductor core of conductive flat conductive material and with an insulation of an insulating material encasing the flat conductor core, wherein the height of the flat conductor core is less than the width of the flat conductor core, wherein the flat conductor core has at least one narrow side that limits the width of the flat conductor core on one side, and wherein the at least one narrow side of the flat conductor core has at least in sections over the length of the flat conductor a partial surface whose contour in the cross-section of the flat conductor core forms a straight section that extends over a part of the height of the flat conductor core, in that the straight section extends over at least 75% of the height of the flat conductor core and that the insulation at least in sections over the length of the flat conductor on at least one side of the flat conductor core, in particular on the at least one narrow side, has a greater wall thickness than on at least one other side of the flat conductor core, in particular on at least one broad side.

Owing to the presence of a partial surface, whose contour extends in the shape of a straight section over at least 75% of the height of the flat conductor core, the same flat conductor core cross-section can be achieved with a smaller flat conductor core width than with flat conductor cores in which the corresponding straight section extends over less than 75% of the flat conductor core height If the flat conductor core has for example a substantially rectangular cross-section with rounded corners, then owing to the reduction of the radii of curvature of the rounded corners an increase of the cross-sectional area at constant width, or a reduction of the flat conductor core width at constant cross-sectional area, respectively, can be achieved.

Owing to the reduction of the flat conductor core width installation space becomes free, which advantageously can be used in order correspondingly to increase the wall thickness of the insulation in this region so as to achieve a further improvement of the stability of the flat conductor in the region of the narrow sides. In this way the first and second teachings advantageously co-operate synergistically to improve the stability of the flat conductor, since a flat conductor can be made available that is neutral as regards installation space but is optimised as regards bending.

Further features and advantages of the present invention are described hereinafter with the aid of exemplary embodiments, in which reference is made to the accompanying drawings.

DETAILED DESCRIPTION OF SPECIFIC EMBODIMENTS

Figure 1:
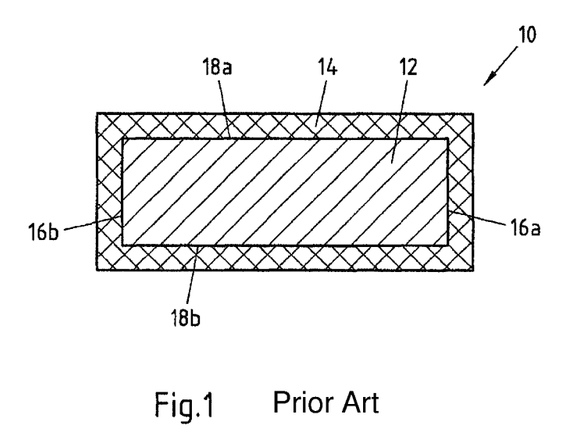
FIG. 1 shows a first electrical flat conductor from the prior art in cross-section.

FIG. 1 shows a first electrical flat conductor 10 from the prior art in cross-section. The flat conductor has a flat conductor core 12 of conductive flat conductor material, such as for example an aluminium alloy, and an insulation 14 of an insulating material, such as for example polyvinyl chloride, encasing the flat conductor core 12.

The flat conductor core 12 has a rectangular cross-section, whose width is limited by two narrow sides 16*a-b* and whose height is limited by two broad sides 18*a-b*. The height of the flat conductor core 12 is in this case less than its width. With a rectangular cross-section the narrow sides 16*a-b* and broad sides 18*a-b* of the flat conductor core 12 respectively meet one another at right angles, so that the flat conductor core 12 has quite sharp edges. These sharp edges can severely stress the insulation 14, so that damage to the insulation 14 frequently occurs especially during a bend forming of the flat conductor 10.

Figure 2:
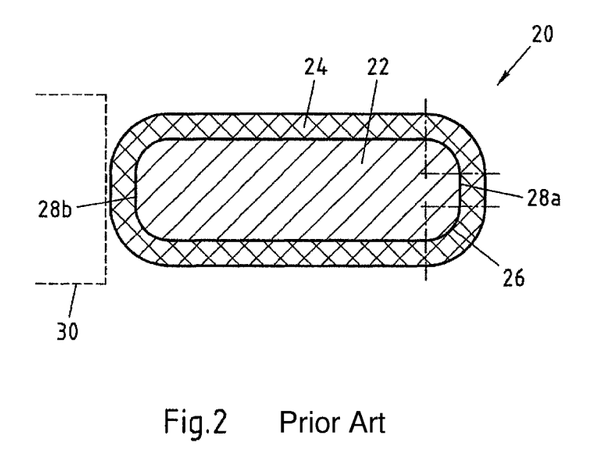
FIG. 2 shows a second electrical flat conductor from the prior art in cross-section.

In the prior art there are also used flat conductors such as the flat conductors 20 illustrated in FIG. 2. The flat conductor 20 also has a flat conductor core 22, which is encased in an insulation 24. The height of the flat conductor 20 is for example 2.5 mm and the width is 25 mm, so that the flat conductor 20 has a height to width ratio of 1:10. The flat conductor core 22 has a substantially rectangular cross-section with rounded corners 26, so that the flat conductor core 22 correspondingly has rounded edges extending in the longitudinal extension direction of the flat conductor 20, which affect the insulation 24 less strongly than the sharp edges of the flat conductor core 12. The transition between the straight sides and the rounded edges in the cross-section of the flat conductor core 22 is indicated in FIG. 2 by dash-dot lines.

It has however been found that the rounded corners 26 can also lead to problems, and specifically in the bend forming of the flat conductor 20 around a narrow side 28*a-b* of the flat conductor core 22. Owing to the rounded corners the bearing surface with which the flat conductor 20 rests on a bending tool 30 used for the bend forming is in fact reduced. The forces exerted on the flat conductor 20 by the bending tool 30 during the bend forming are thereby transmitted to a relatively small area, so that very high bending pressures occur there, as a result of which the insulation 24 in this region may be damaged. In particular the shape of the narrow side 28*b* can on account of the rounded corners 26 act like a blade on the insulation 24. With flat conductor cores with a height of 2 mm in some cases radii of curvature of the rounded corners of 0.5 mm and more are used, so that the straight sections of the narrow sides 28a-b are reduced to 1 mm or less, which then act like a blade on the insulation 24.

Figure 3:
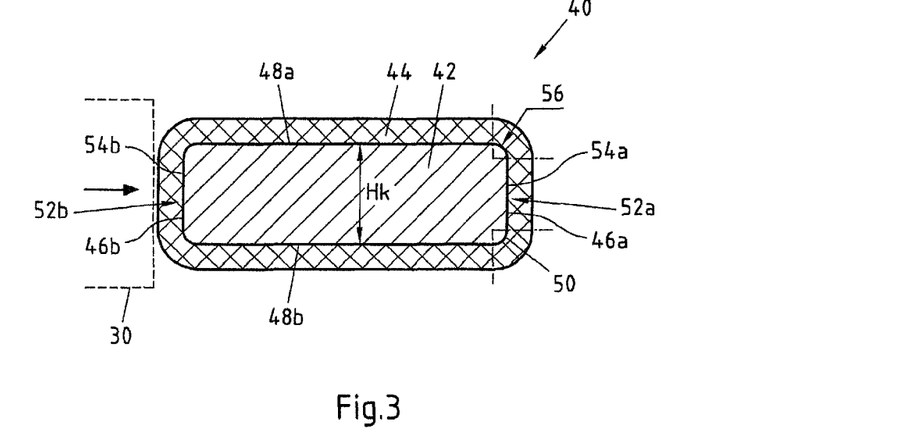
FIG. 3 shows an exemplary embodiment of an electrical flat conductor according to the first teaching of the present invention in cross-section.

FIG. 3 now shows a first exemplary embodiment of the flat conductor 40 according to the first teaching of the present invention. The flat conductor 40 has a flat conductor core 42 of conductive flat conductor material and an insulation 44 of an insulating material encasing the flat conductor core 42.

The cross-section of the flat conductor core 42 is formed substantially rectangular with two narrow sides 46a-b limiting the width of the flat conductor core 42 and two broad sides 48a-b limiting the height of the flat conductor core. The corners 50 of the flat conductor core 42 are rounded as in the flat conductor 20.

On the narrow sides 46a-b the flat conductor core 42 has respectively a partial surface 52a-b, whose contours in the cross-section illustrated in FIG. 3 respectively form a straight section 54a-b. The straight sections 54a-b adjoin at the top and bottom respectively to the curved contours of the rounded corners 50 and therefore extend only over a part of the height Hk of the flat conductor core 42. The boundaries between the straight section 46a and the contours of the adjoining corners 50 are indicated in FIG. 3 by horizontal dash-dot lines.

The flat conductor 40 now differs from the flat conductor 20 in that the straight sections 54a-b in each case extend over at least 75% of the height Hk of the flat conductor core 42. To this end the radii of curvature 56 of the rounded edges 50 are dimensioned so that they correspond respectively to at most one eighth of the height Hk of the flat conductor core. With a height of the flat conductor core of 2 mm radii of curvature of for example 0.2 mm could be chosen. The straight section 54a-b thereby has a height of 1.6 mm and thus corresponds to 80% of the height of the flat conductor core 42.

In this way, with the partial surfaces 52a-b sufficiently large bearing surfaces are made available for a bending tool 30, so that the forces transmitted by the bending tool 30 to the flat conductor 40 are distributed over a sufficiently large area and a local overloading of the insulation 44 can be avoided. In particular the cutting action of the flat conductor core 42, as occurs in the case of the flat conductor 20, can be prevented by the suitable dimensions of the partial surfaces 52a-b.

Figure 4:
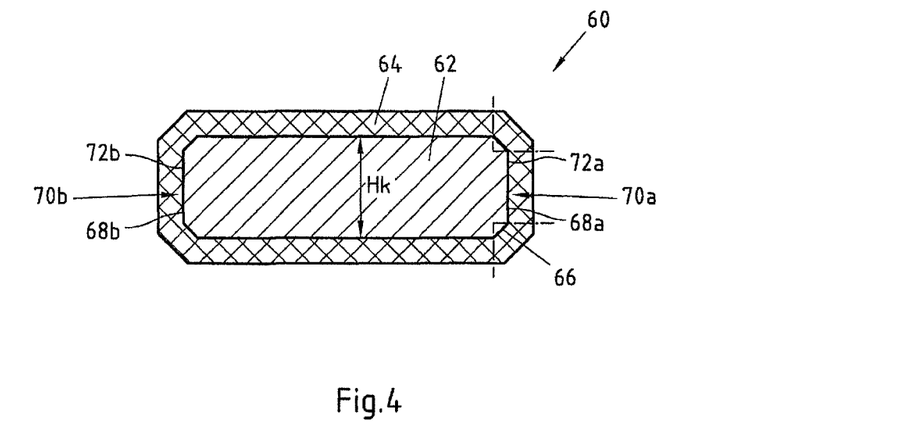
FIG. 4 shows a second exemplary embodiment of an electrical flat conductor according to the first teaching of the present invention in cross-section.

An alternative exemplary embodiment of the flat conductor 60 according to the first teaching of the present invention is illustrated in FIG. 4.

The flat conductor 60 differs from the flat conductor 40 in that the flat conductor core 62 of the flat conductor 60 has a substantially rectangular cross-section with chamfered corners 66, so that overall in principle an octagonal cross-sectional shape is obtained. Adjoining the chamfered corners 64 the narrow sides 68a-b of the flat conductor core 62 have partial surfaces 70a-b, whose contour in cross-section forms straight sections 72a-b in FIG. 4.

The chamfered corners 64 extend respectively over at most one eighth of the height Hk of the flat conductor core 62, so that the sections 72a-b extend respectively over at least 75% of the height Hk of the flat conductor core 62. Also in this way a sufficiently large bearing surface for a bending tool is created, so that a local overloading and damage to the insulation 64 can be avoided.

Figure 5:
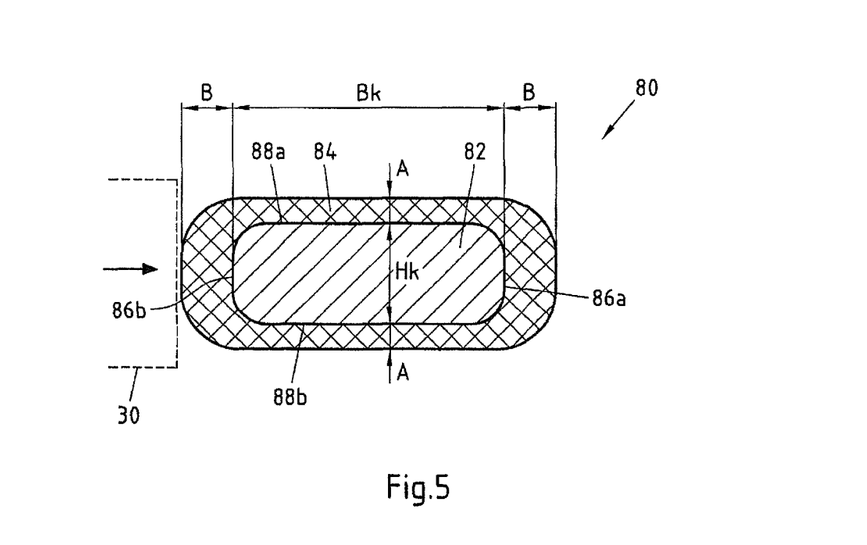
FIG. 5 shows an exemplary embodiment of an electrical flat conductor according to the second teaching of the present invention in cross-section.

FIG. 5 shows an exemplary embodiment of the flat conductor 80 according to the second teaching of the present invention. The flat conductor 80 has a flat conductor core 82 of conductive flat conductor material as well as an insulation 84 of an insulating material, such as for example polyvinyl chloride, encasing the flat conductor core 82. The height Hk of the flat conductor core 82 is less than the width Bk of the flat conductor core 82. The flat conductor core 82 has a substantially rectangular cross-section with two narrow sides 86a-b and two broad sides 88a-b.

Since the narrow sides 86a-b have a smaller area than the broad sides 88a-b, during bend forming around the narrow sides 86a-b larger forces per unit area, i.e. larger bending pressures, are exerted on these narrow sides than on the broad sides 88a-b during bend forming around the broad sides 88a-b.

The insulation 84 of the flat conductor 80 has on the narrow sides 86a-b of the flat conductor core 82 (wall thickness B) a greater wall thickness than on the broad sides 88a-b of the flat conductor core 82 (wall thickness A). In this way the insulation 84 on the narrow sides 86a-b is selectively reinforced and is thereby matched to the higher bending pressures occurring there during bend forming around the narrow sides 86a-b. In this way damage to the insulation 84 in the region of the narrow sides 86a-b can be prevented in such a bend forming.

Figure 6:
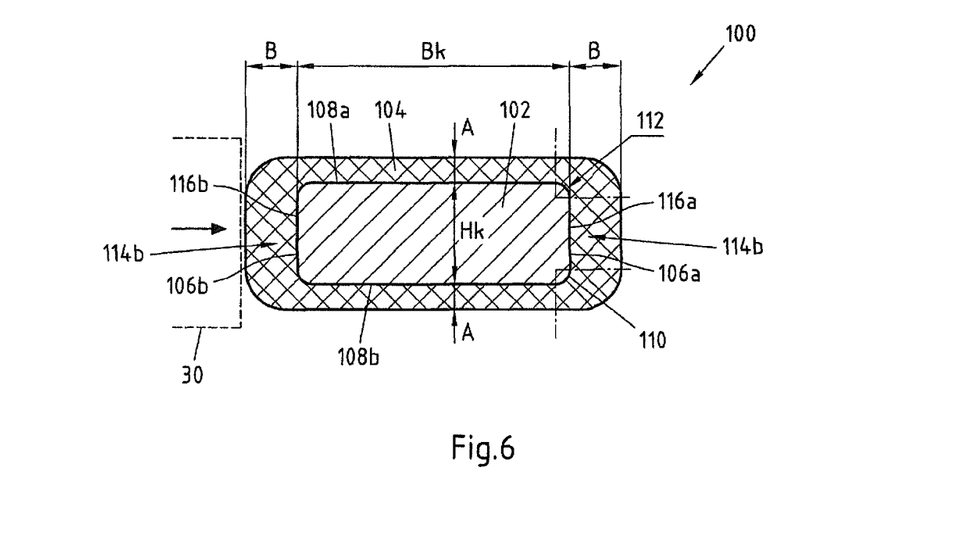
FIG. 6 shows an exemplary embodiment of an electrical flat conductor according to the first and second teaching of the present invention in cross-section.

FIG. 6 shows an exemplary embodiment of an electrical flat conductor 100 according to the first and second teaching of the present invention. With this flat conductor 100 the first and second teaching of the present invention are combined with one another in a synergistically advantageous manner.

The flat conductor 100 has a flat conductor core 102 and an insulation 104 encasing the latter, wherein the flat conductor core 102 has a substantially rectangular cross-section with two narrow sides 106a-b, two broad sides 108a-b and rounded corners 110. The narrow sides 106a-b have partial surfaces 114a-b, whose contours in cross-section in FIG. 6 respectively form a straight section 116a-b.

The radii of curvature 112 of the rounded corners 110 correspond in each case to at most one eighth of the height Hk of the flat conductor core 102, so that the sections 116a-b extend over at least 75% of the height Hk of the flat conductor core 102. In this way a sufficiently large bearing surface is made available for a bending tool 30, so that the forces transmitted by the bending tool 30 are distributed over a sufficiently large area and no local overloading of the insulation 104 occurs. Furthermore in this way it is achieved that the flat conductor core 102 for the same width Bk has a larger cross-sectional area than is the case for example with the flat conductor core 22 of the flat conductor 20 in FIG. 2, in which the corresponding straight section of the contour of the narrow sides extends over a considerably smaller part of the flat conductor core height Hk.

Accordingly the cross-sectional area Q of a flat conductor core of height Hk and width Bk with a substantially rectangular cross-section with rounded corners with a radius of curvature R is given by the following formula: $Q=Hk \cdot Bk-(4-\pi) \cdot R^2$. Accordingly a correspondingly smaller width Bk can also be chosen for a predetermined cross-sectional area Q with a smaller radius of curvature R, according to the formula:

$$Bk=(Q+(4-\pi) \cdot R^2)/Hk.$$

In this way the flat conductor core 102 can be formed with a smaller width Bk without the cross-sectional area Q of the flat conductor core 102 being reduced compared to the cross-sectional area of the flat conductor 20 of FIG. 2. The space that is thereby made available in the region of the narrow sides 106a-b of the flat conductor core 102 can now be used advantageously to increase the wall thickness of the insulation 104 in the region of the narrow sides 106a-b, so that the wall thickness B in the region of the narrow sides 106a-b is greater than the wall thickness A in the region of the broad sides 108a-b. In this way a specific reinforcement of the insulation 104 in the region of the stressed narrow sides 106a-b can be achieved, without the external dimensions of the flat conductor 100 having to be increased compared to the dimensions of the flat conductor 20 of FIG. 2.

Owing to the combination of the first teaching and the second teaching of the present invention, a stable flat conductor 100 can thus be made available with an unaltered installation space compared to the flat conductor 20 of FIG. 2, and which is improved in particular as regards a bend forming around its narrow sides. The features of the first and second teaching of the present invention in this way co-operate synergistically in an advantageous manner with the flat conductor 100.

Figure 7:
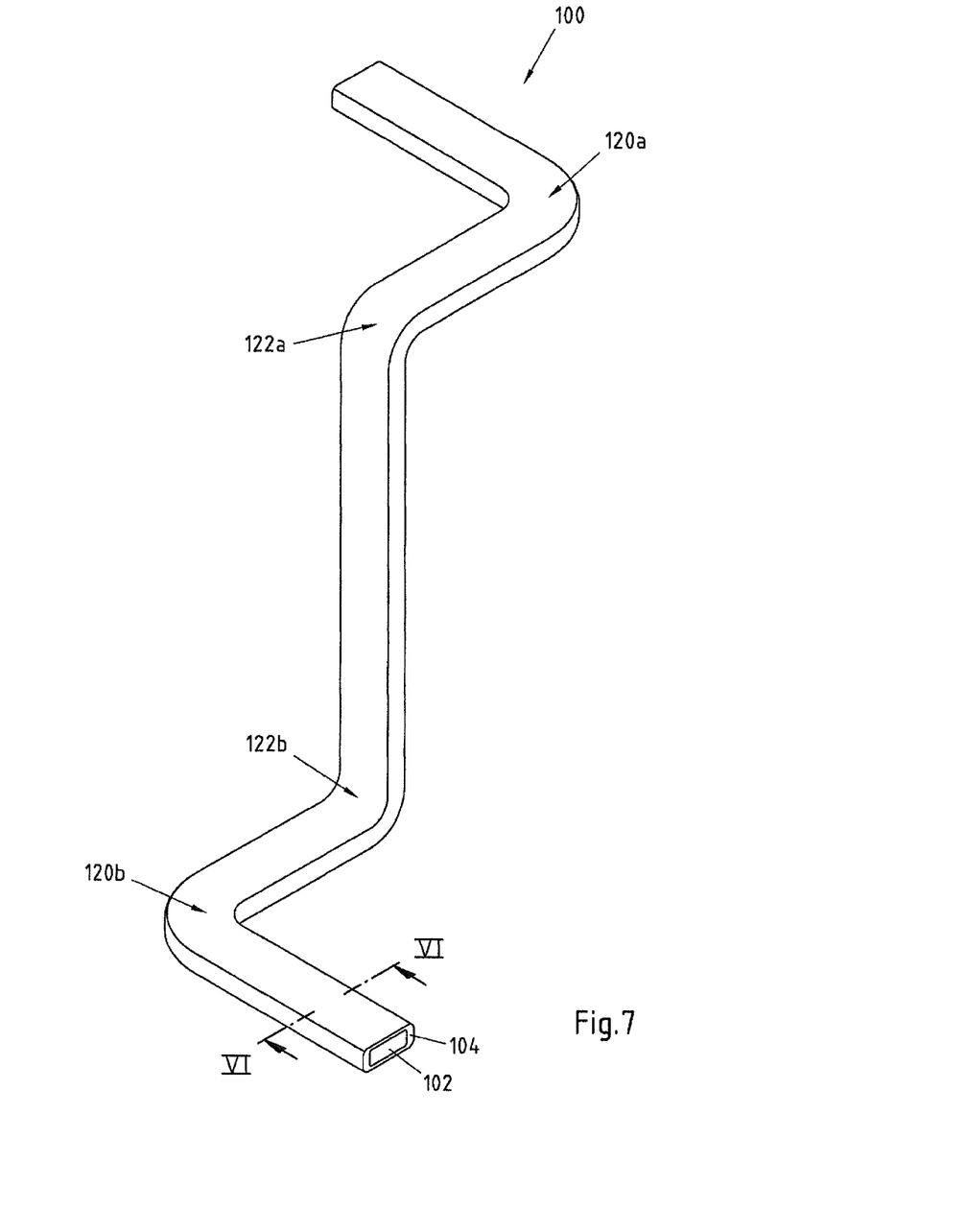
FIG. 7 shows the shaped electrical flat conductor of FIG. 6 in a perspective view.

FIG. 7 shows the flat conductor 100 of FIG. 6 after a three-dimensional bend forming. The cross-section of FIG. 6 is indicated in FIG. 7 by the sectional plane VI. The flat conductor 100 has several bends 120a-b, 122a-b, which were introduced into the flat conductor 100 by means of one or more bending tools. At the bends 120a-b the flat conductor 100 and therefore correspondingly also the flat conductor core 102 are in each case bent around a narrow side. At the bends 122a-b the flat conductor 100 and therefore correspondingly also the flat conductor core 102 are in each case bent around a broad side. Owing to the configuration of the flat conductor 100, as was described in connection with FIG. 6, in particular the incorporation of the bends 120a-b is facilitated since the flat conductor has a more stable structure for bends 120a-b around a narrow side than for example the flat conductor 20 of FIG. 2, and the risk of damage to the insulation 104 when bending around a narrow side is considerably reduced.

What is claimed is:

1. Electrical flat conductor for motor vehicles comprising:
   a flat conductor core of electrically conductive flat conductor material, wherein the flat conductor core has a height that is less than a width of the flat conductor core and has at least one narrow side, which limits the width of the flat conductor core on one side;
   wherein the at least one narrow side of the flat conductor core has at least in sections over the length of the flat conductor a partial surface, whose contour in the cross-section of the flat conductor core forms a straight section, which extends over at least 75% and at most 90% of the height of the flat conductor core; and
   an insulation of an insulating material encasing the flat conductor core;
   wherein the flat conductor extends in length with at least one bend around a narrow side of the flat conductor core, the flat conductor core remaining in a same plane throughout the bend.

2. Electrical flat conductor according to claim 1, wherein the flat conductor core has at least one broad side, which limits the height of the flat conductor core on one side, and wherein the partial surface of the at least one narrow side of the flat conductor core extends substantially perpendicular to the at least one broad side of the flat conductor core.

3. Electrical flat conductor according to claim 2, wherein the partial surface of the at least one narrow side extends substantially over the whole length of the flat conductor.

4. Electrical flat conductor according to claim 3, wherein the flat conductor core has two narrow sides and two broad sides and a substantially rectangular cross-section.

5. Electrical flat conductor according to claim 4, wherein the flat conductor core has a substantially rectangular cross-section with rounded corners, wherein the radii of curvature of the rounded corners on at least one narrow side of the flat conductor core are each at most one eighth of the height of the flat conductor core.

6. Electrical flat conductor according to claim 1, wherein the insulation at least in sections over the length of the flat conductor on at least one side of the flat conductor core has a greater wall thickness than on at least one other side of the flat conductor core.

7. Electrical flat conductor according to claim 6, wherein the insulation of substantially over the whole length of the flat conductor on the at least one side of the flat conductor core has a greater wall thickness than on the at least one other side of the flat conductor core.

8. Electrical flat conductor according to claim 6, wherein the wall thickness of the insulation on the at least one side of the flat conductor core is at least 10% greater than on the at least one other side of the flat conductor core.

9. Electrical flat conductor according to claim 6, wherein the wall thickness of the insulation on the at least one side of the flat conductor core is at least 20% greater than on the at least one other side of the flat conductor core.

10. Electrical flat conductor according to claim 6, wherein the wall thickness of the insulation on the at least one side of the flat conductor core is at least 25% greater than on the at least one other side of the flat conductor core.

11. Electrical flat conductor according to claim 6, wherein the flat conductor core has at least one broad side, which limits the height of the flat conductor core on one side, and the insulation on the at least one narrow side of the flat conductor core has a greater wall thickness than on the at least one broad side of the flat conductor core.

12. Electrical flat conductor according to claim 11, wherein the flat conductor core has two narrow sides and two broad sides and a substantially rectangular cross-section.

13. Electrical flat conductor according to claim 12, wherein the height of the flat conductor core is at most 2.5 mm.

14. Electrical flat conductor according to claim 12, wherein the ratio of the height of the flat conductor core to the width of the flat conductor core is between 1:5 and 1:10.

15. Electrical flat conductor according to claim 11, wherein the wall thickness of the insulation on the at least one narrow side of the flat conductor core is at least 10% greater than on the at least one broad side of the flat conductor core.

16. Electrical flat conductor according to claim 11, wherein the wall thickness of the insulation on the at least one narrow side of the flat conductor core is at least 20% greater than on the at least one broad side of the flat conductor core.

17. Electrical flat conductor according to claim 11, wherein the wall thickness of the insulation on the at least one narrow side of the flat conductor core is at least 25% greater than on the at least one broad side of the flat conductor core.

18. Electrical flat conductor according to claim 1, wherein the flat conductor core has a cross-section of at least 16 mm$^2$.

19. Electrical flat conductor according to claim 1, wherein the insulation has a thickness in a range between 0.5 mm and 1.5 mm.

* * * * *